United States Patent
Stabel et al.

(10) Patent No.: US 7,424,086 B2
(45) Date of Patent: Sep. 9, 2008

(54) FUEL ASSEMBLY FOR A PRESSURIZED-WATER NUCLEAR REACTOR

(75) Inventors: Jürgen Stabel, Erlangen (DE); Udo Borsdorf, Höchstadt (DE); Hans-Peter Hübsch, Herzogenaurach (DE)

(73) Assignee: Areva NP GmbH, Erlangen (DE)

( * ) Notice: Subject to any disclaimer, the term of this patent is extended or adjusted under 35 U.S.C. 154(b) by 253 days.

(21) Appl. No.: 11/024,147

(22) Filed: Dec. 28, 2004

(65) Prior Publication Data
US 2005/0129166 A1    Jun. 16, 2005

Related U.S. Application Data

(63) Continuation of application No. PCT/EP03/06431, filed on Jun. 18, 2003.

(30) Foreign Application Priority Data

Jun. 29, 2002 (DE) ................ 102 29 292
Aug. 8, 2002 (DE) ................ 102 36 399

(51) Int. Cl.
*G21C 3/00* (2006.01)
(52) U.S. Cl. .............. 376/409; 376/434; 376/438; 376/453
(58) Field of Classification Search ........... 376/409, 376/434, 438, 453
See application file for complete search history.

(56) References Cited

U.S. PATENT DOCUMENTS

| 3,383,287 | A | * | 5/1968 | Jackson ............. 376/362 |
| 3,665,586 | A | * | 5/1972 | Jabsen ............. 29/428 |
| 4,683,117 | A | | 7/1987 | Carlson et al. |
| 5,094,805 | A | * | 3/1992 | Suchy et al. ......... 376/438 |
| 5,610,959 | A | * | 3/1997 | Fecteau et al. ........ 376/419 |
| 6,167,104 | A | | 12/2000 | Garzarolli et al. |
| 6,678,344 | B2 | * | 1/2004 | O'Leary et al. ....... 376/170 |

FOREIGN PATENT DOCUMENTS

| DE | 44 22 032 A1 | 1/1995 |
| DE | 196 35 927 C1 | 2/1998 |
| DE | 298 17 731 U1 | 2/1999 |
| DE | 299 19 413 U1 | 4/2000 |
| JP | 11202071 | 7/1999 |

* cited by examiner

*Primary Examiner*—Rick Palabrica
(74) *Attorney, Agent, or Firm*—Laurence A. Greenberg; Werner H. Stemer; Ralph E. Locher

(57) ABSTRACT

A fuel element for a pressurized water reactor has fuel rods guided through a number of axially spaced spacers. The spacers form a square grid with mesh openings arranged in rows and columns. Support tubes that do not contain fuel pass through a number of the mesh holes and are joined to the meshes. The support tubes are spread out in positions within the grid with a predetermined number of support tubes and a distribution thereof within the grid, which is rotationally symmetric about 90° with regard to a rotation about the central axis of the spacer, the central axis is perpendicular to the grid plane, the number of rows and columns that do not contain any support tubes is minimal. Optionally, remaining inner rows and columns that do not contain any support tubes are not situated next to one another.

5 Claims, 5 Drawing Sheets

FUEL ASSEMBLY FOR A PRESSURIZED-WATER NUCLEAR REACTOR

CROSS-REFERENCE TO RELATED APPLICATION

This is a continuing application, under 35 U.S.C. § 120, of copending international application No. PCT/EP2003/006431, filed Jun. 18, 2003, which designated the United States; this application also claims the priority, under 35 U.S.C. § 119, of German patent application No. 102 29 292.2, filed Jun. 29, 2002, and German patent application No. 102 36 399.4, filed Aug. 8, 2002; the prior applications are herewith incorporated by reference in their entirety.

BACKGROUND OF THE INVENTION

FIELD OF THE INVENTION

The invention relates to a fuel assembly for a pressurized-water nuclear reactor (PWR). Such a reactor is described, for example, in German patent DE 196 35 927 C1 and U.S. Pat. No. 6,167,104.

An example of a fuel assembly to which this description pertains is illustrated in FIG. 7. In a fuel assembly of this type, a multiplicity of fuel rods 2 are guided parallel to one another in the axial rod direction by a plurality of spacers 4 which are axially spaced apart from one another. Each of the spacers 4 forms a two-dimensional grid with a plurality of meshes 6 arranged in columns 8 and rows 10. Besides the fuel rods, support tubes project through the meshes 6 of the grid at selected positions. The support tubes do not contain any fuel and they are intended to receive and guide control rods (the support tubes are known as control rod guide tubes 12). Moreover, there may also be support tubes, which likewise do not contain any fuel and serve only to increase the stability (instrumentation thimbles or structure tubes), in the fuel assembly 2 illustrated by way of example neither instrumentation thimbles nor structure tubes are provided. These support tubes, unlike the fuel rods, are welded to the spacers 4 in the meshes 6, so that their stabilizing function is ensured throughout the entire life span of the fuel assembly 2.

In the event of hypothetical external accidents, for example in the event of an earthquake or a loss of coolant accident with a major leak, the spacers may be subject to a considerable impact load from the adjacent fuel assemblies. The permanent deformations which then occur must not exceed maximum permissible values, in order to ensure that the control rods can still be introduced into the control rod guide tubes in order in this way to allow operation to continue safely or to allow the plant to be shut down safely. Whereas plastic deformations to a limited extent are in principle permitted, accordingly relatively extensive buckling, which leads to a significant offset of the control rod guide tubes arranged in the fuel assembly, must be avoided.

Accordingly, the spacers have to be designed and constructed in such a way that the expected impact loads do not lead to extensive buckling or kinking of the spacer. In practice, the development aim is a buckling resistance for fresh, non-irradiated spacers (BOL (=beginning of life) spacers) of approximately 20 kN. This means that BOL spacers can withstand the impact load (a really active transverse force) which occurs in the event of an accident (earthquake, LOCA) provided that this impact load is less than 20 kN.

It has now emerged that spacers which have been in use for a relatively long period of time and have reached the end of their service life (EOL=end of life) have a considerably reduced buckling resistance or buckling limit compared to new spacers. The reduction in the buckling resistance is dependent on the particular type of spacer and may amount to more than 50 to 60%.

German published patent application DE 44 22 032 A1 describes an 18×18 spacer which at the edge, in the region of its corners, is provided with support tubes in order to reduce bending of the fuel rods during reactor operation. However, while that prior art spacer provides improved buckling resistance at the end of the service life, it is still not optimal.

SUMMARY OF THE INVENTION

It is accordingly an object of the invention to provide a fuel assembly for a pressurized water reactor which overcomes the above-mentioned disadvantages of the heretofore-known devices and methods of this general type and the spacers of which have a sufficient buckling resistance, even in the event of strong accident loads, and even at the end of their service life.

With the foregoing and other objects in view there is provided, in accordance with the invention, a fuel assembly for a pressurized-water nuclear reactor, comprising:

a multiplicity of fuel rods;

a plurality of spacers mutually spaced-apart axially along the fuel rods, each of the spacers substantially defining a grid plane and forming a square grid with a multiplicity of meshes arranged in rows and columns, the rows including inner rows and the columns including inner columns;

a plurality of support tubes respectively guided through the meshes and cohesively joined to the spacers at the meshes, the support tubes not containing fuel;

the support tubes being distributed to positions in the grid such that, with a given number of support tubes in the grid, a distribution of the support tubes in the grid does not vary upon a rotation of the grid through 90° about a center axis extending perpendicular to the grid plane of the spacer; and wherein a number of inner rows and inner columns having no said support tubes is at a minimum, and no said inner rows and inner columns without the support tubes adjoin one another.

In other words, the objects of the invention are achieved with the fuel assembly that includes a multiplicity of fuel rods which are guided in a plurality of axially spaced spacers which in each case form a square grid with a multiplicity of meshes arranged in rows and columns. In each case one support tube is guided through a number of these meshes and is cohesively joined to the spacer in these meshes, the support tube not containing any fuel. According to the invention, these support tubes are distributed in such a manner in the grid that, for a predetermined number of support tubes in the grid and for a distribution of the support tubes in the grid which is rotationally symmetrical in the event of rotation through 90° about the center axis, perpendicular to the grid plane, of the spacer, the number of rows and columns without any support tubes is at a minimum. For a predetermined number of support tubes and meshes, moreover, the support tubes are distributed in such a manner in the grid that any remaining inner rows and columns without any support tubes are not arranged next to one another. In other words, any multiple or double rows or columns without any support tubes which may be present are located exclusively at the edge of the fuel assembly.

These measures significantly improve the EOL buckling resistance, with an optimized EOL buckling resistance being ensured despite the presence of rows and columns without any support tubes.

In this context, the invention is based on the discovery that the cause of the reduced EOL buckling resistance is a relaxation in the spring elements which are present in the meshes of the spacer for spring bearing of the fuel rods. The relaxation of the rod bearing during operation causes the supporting action of the fuel rods on the spacer structure to disappear, so that only the control rod guide tubes, structure tubes or instrumentation thimbles—referred to in the application by the general term of "support tubes—which have been welded in the meshes of the spacer still have a supporting action.

The term "cohesively joined" refers primarily to a weld connection but includes all related material bonding joining techniques, such as soldering, brazing, gluing, and combinations thereof.

FIGS. 8 and 9 each show a diagrammatic illustration of a conventional spacer 4, in the example a spacer with 17×17 meshes 6, to the opposite side edges of which a compressive force F has been exerted perpendicular to the rows 10 at a level above the kinking or buckling limit $F_{crit}$. For the corresponding laboratory tests, support tube sections which on both sides project approximately 10 mm above the spacer 4 were welded into the spacer 4 at the positions $P_a$ at which control rod guide tubes 12 are located in the fuel assembly. To allow the EOL buckling resistance to be determined, the spacer 4 was either thermally relaxed and each mesh 6 without a support tube was occupied by sections of fuel rod cladding tubes belonging to the respective spacer type, or tube sections with a slightly smaller external diameter were inserted instead of the cladding tube sections normally intended for this type of spacer, in order in this way to simulate the relaxation of the spacer 4. The cladding tube sections used also project above the spacer 4 and simulate the fuel rods mounted resiliently in the meshes not occupied by control rod guide tubes in the case of a completely configured fuel assembly.

It can now be seen, by way of example, from FIG. 8 that when the buckling limit $F_{crit}$ is reached, shear-type buckling or kinking of two middle rows $10_{11}$, $10_{12}$ occurs. An increase in the transverse force F leads to buckling of further rows $10_1$, $10_2$; $10_8$, $10_9$; $10_{16}$ and $10_{17}$, as illustrated in FIG. 9.

Moreover, FIGS. 8 and 9 show that the buckling occurs first of all in the rows 10 which do not include a support tube section fixedly welded to the spacer 4 (row without any support tubes).

Working on the basis of this discovery, the invention is now based on the consideration that the configuration of the support tubes welded fixedly in the spacer has a considerable influence on the EOL buckling resistance thereof. For each predetermined fuel assembly with a predetermined type of spacer, it is now possible, by modifying the arrangement of these support tubes, to find a configuration which has an improved EOL buckling behavior yet retains the symmetry requirements and the number of support tubes.

It is particularly advantageous to use an arrangement in which the support tubes are distributed in such a manner in the grid that no rows or columns without any support tubes are located between the rows and columns which include a support tube. In other words, any remaining rows and columns without any support tubes are located exclusively at the edge. In this embodiment, the ease of introduction of the control rods is improved even in the event of the spacer having buckled.

In an alternative variant solution, with an unchanged configuration of the control rod guide tubes, at least one additional structure tube in a mesh of the spacer is cohesively joined to the spacer in order to avoid internal double rows and double columns without any support tubes. These additional support tubes would not actually be necessary for stability reasons at the start of use of the spacer (BOL=beginning of life), but do increase its EOL buckling resistance such that the latter reaches a level which corresponds to the BOL buckling resistance of the spacer of the same type which is not provided with additional structure tubes. In other words, a structure tube (in the event of an eccentric position for reasons of symmetry, at least four structure tubes) is additionally introduced into a known type of fuel assembly, even though such tubes do not appear necessary for strength reasons at least at the start of use and are indeed avoided on account of the associated reduction in the power of the fuel assembly.

Other features which are considered as characteristic for the invention are set forth in the appended claims.

Although the invention is illustrated and described herein as embodied in a fuel assembly for a pressurized-water nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
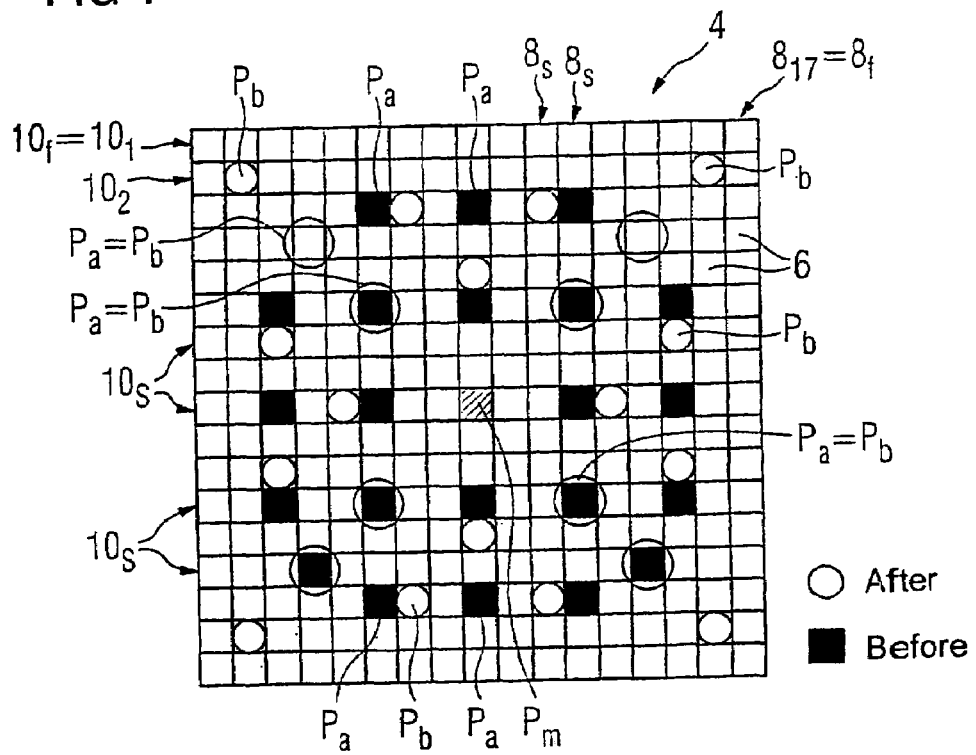
FIG. 1 is a plan view of a spacer of a 17×17 fuel assembly in the form of an outline illustration showing the positions of the control rod guide tubes of a spacer used in the prior art and the positions of the control rod guide tubes for a configuration that has been improved in accordance with the invention.

Referring now to the figures of the drawing in detail and first, particularly, to FIG. 1 thereof, a plurality of meshes 6 in a spacer 4 have control rod guide tubes passing through them in positions $P_a$, $P_b$. The control rod guide tubes are distributed symmetrically about the center axis, and they extend perpendicular to the plane of the drawing, of the spacer 4 or the fuel assembly, in such a manner that they can be transferred into the same positions on rotation through 90°. Only the positions $P_a$, $P_b$ of the control rod guide tubes are illustrated in the figure. The control rod guide tubes themselves are not shown in this figure, for the sake of clarity.

The figure shows the spacer 4 of a 17×17 fuel assembly which in the center position $P_m$, i.e. its hatched mesh 6 located in the middle, is provided with an instrumentation thimble, likewise not illustrated in the figure. Solid black squares indicate the positions $P_a$ of the control rod guide tubes as they are realized in a prior art fuel assembly ("before" control rod position). A circle indicates positions $P_b$ of the control rod guide tubes which result according to the invention with a view to improving the EOL buckling resistance ("after" control rod positions). The position $P_a=P_b$, enclosed by a circle, of a control rod guide tube indicates that a control rod guide tube remains there even in the improved design. The positions of all the other control rod guide tubes have been changed.

It can now be seen from the figure that, while maintaining the same number of the control rod guide tubes, the distribution of the control rod guide tubes has been altered in such a manner that on the one hand the number of rows $10_f$ without any support tubes (in this example $10_1$, $10_8$, $10_{10}$, $10_{17}$) and of columns $8_f$ without any support tubes (in this example $8_1$, $8_8$, $8_{10}$, $8_{17}$) has been minimized while abiding by the additional condition of rotational symmetry through 90° (no variation in the arrangement in the event of rotation through 90°), and that on the other hand it has been ensured that these remaining rows and columns $10_f$, $8_f$ without any support tubes are not arranged next to one another.

Even after the redistribution of the control rod guide tubes, rows $10_f$ and columns $8_f$ without any support tubes still remain between the rows $10_s$ and columns $8_s$ in which there is in each case at least one support tube (control rod guide tube or instrumentation thimble). In the exemplary embodiment, these rows or columns without support tubes are the rows $10_8$ and $10_{10}$ located between the rows $10_7$, $10_9$ and $10_9$, $10_{11}$, respectively, which do include a support tube (the same also applies to the columns).

Figure 2:
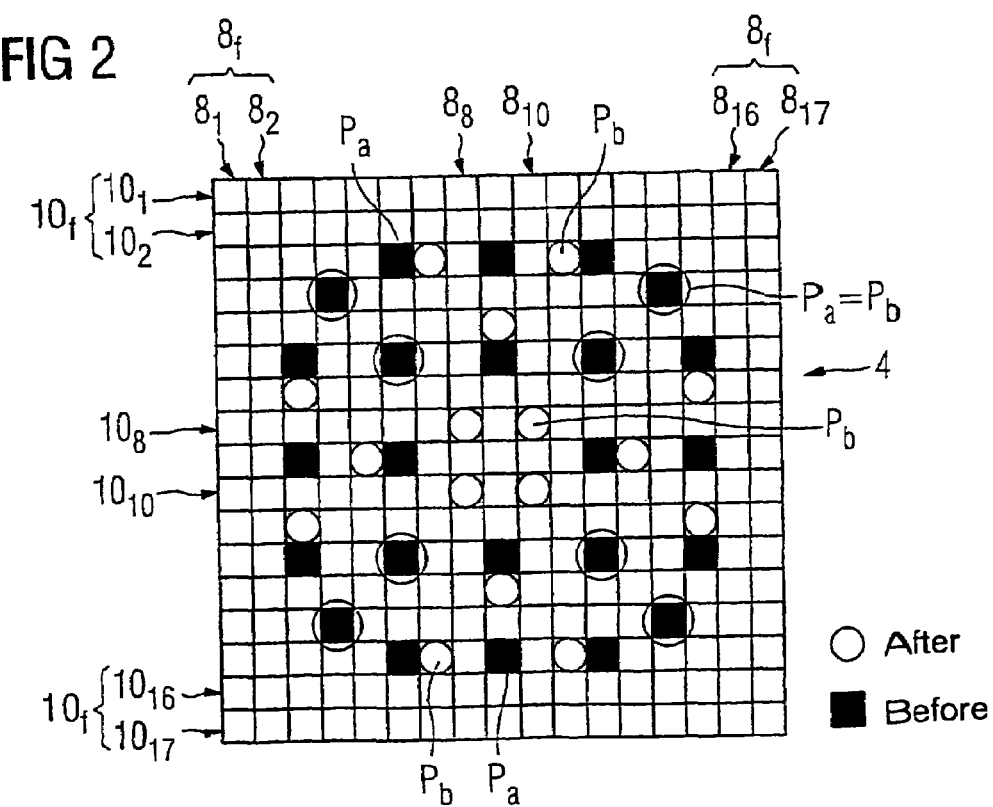
FIG. 2 is a similar view of a correspondingly improved configuration of a 17×17 fuel assembly in which no instrumentation thimble is disposed in the center.

The exemplary embodiment shown in FIG. 2 illustrates an optimized configuration of the control rod guide tubes in a 17×17 fuel assembly without an internal instrumentation thimble. In this case, all the other positions bar eight positions $P_a=P_b$ have likewise been redistributed, so that in each case only the two rows $10_{1,2,16,17}$ and columns $8_{1,2,16,17}$ at the edge are without any support tube. Since it is predominantly inner rows and columns which have to be supported, the absence of the central instrumentation thimble means that four control rod guide tubes have been redistributed to the rows $10_{8,10}$ and columns $8_{8,10}$, so that in this exemplary embodiment a double unoccupied edge column or edge row remains.

Figure 3:
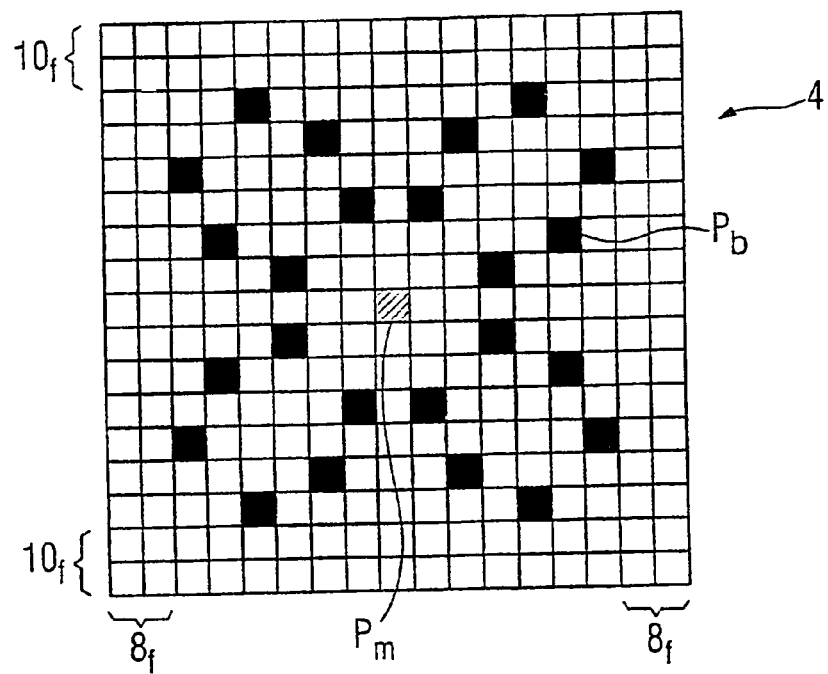
FIGS. 3 and 4 are similar views of alternative embodiments for a 17×17 fuel assembly with an improved control rod guide tube configuration, respectively with and without an internal instrumentation thimble.

In the alternative embodiment shown in FIG. 3, in which, for reasons of clarity, only the improved control rod arrangement is illustrated by means of solid black meshes $P_b$, in a 17×17 fuel assembly with an internal instrumentation thimble (hatched mesh $P_m$), the two rows $10_{1,2,16,17}$ and columns $8_{1,2,16,17}$ located at the edge are likewise not occupied by a control rod guide tube 12.

Figure 4:
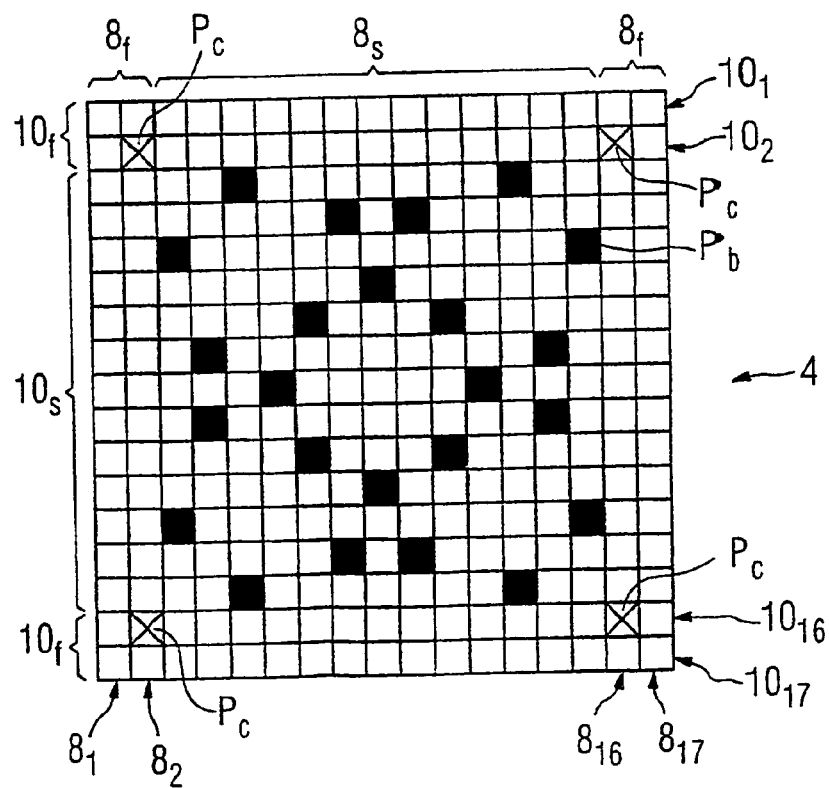

FIG. 4 shows an alternative embodiment without an inner instrumentation thimble. In this variant too, only the two marginal rows $10_{1,2,16,17}$ and columns $8_{1,2,16,17}$ located at the edge are not occupied by a control rod guide tube, and consequently there are no rows $10_f$ or columns $8_f$ without a support tube between the rows $10_s$ or columns $8_s$ which do include a support tube.

In the case of the configuration of the control rod guide tubes illustrated in FIG. 4, it is possible to achieve a further significant improvement in the EOL buckling limit by fitting additional structure tubes in the positions $P_c$ marked by a cross, which are located on the main diagonals in the rows or columns $10_{2,16}$ or $8_{2,16}$, respectively, which directly adjoin the rows or columns $10_{1,17}$ or $8_{1,17}$, respectively, located at the edge.

A basic design criterion for the improved arrangement of support tubes according to the invention, in all the embodiments explained above, is the principle of minimizing the number of rows and columns without any support tubes, while maintaining the lack of variation on rotation through 90°, by virtue of the fact that none of the rows or columns include more than two support tubes, and wherever possible for reasons of symmetry contain only a single support tube. If there is an odd number of rows and columns, the rows and columns which belong to a support tube position on the middle row or the middle column and run perpendicular thereto may in each case include only a single support tube (control rod guide tube, structure tube, instrumentation thimble).

Figure 5:
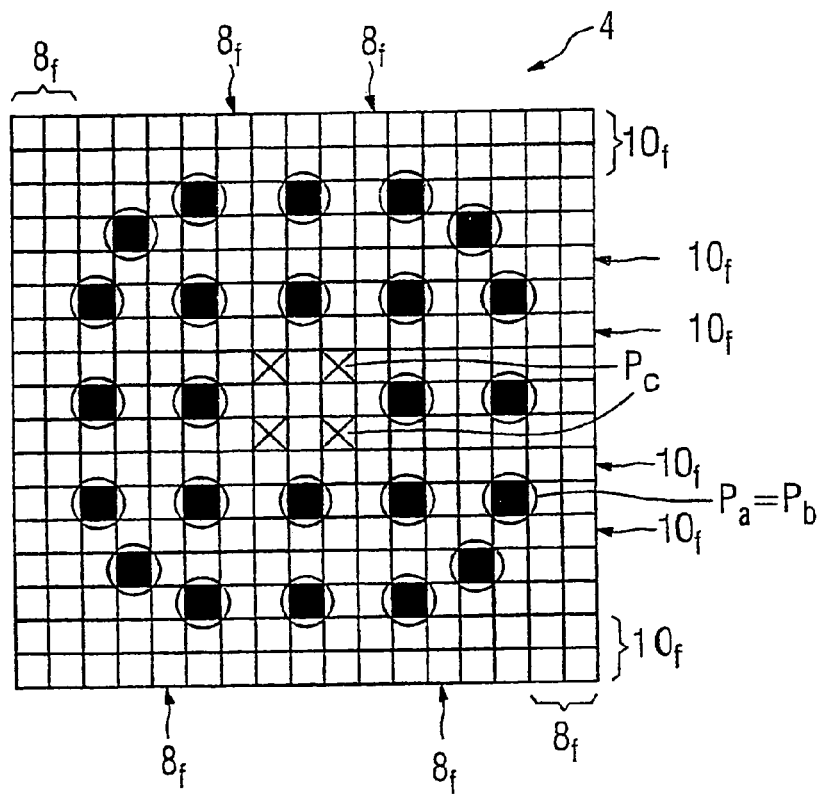
FIG. 5 is a plan view of an embodiment, which has been improved in accordance with the invention, of a 17×17 fuel assembly without an internal instrumentation thimble, in which the positions of the control rod guide tubes are unchanged.

In the embodiment shown in FIG. 5, four structure tubes are additionally inserted at the positions $P_c$ marked by a cross in the 17×17 fuel assembly without instrumentation thimble which is known from the prior art, with the positions $P_a=P_b$ of the control rod guide tubes remaining unchanged. In this way, the inner double row $10_{7,8}$ and $10_{10,11}$ or double column $8_{7,8}$ and $8_{10,11}$ without any support tube, which has proven to be a particular weak point in experiments, are eliminated and the EOL buckling resistance is significantly increased. A fuel assembly which has been improved in this way can be used without problems even in existing pressurized-water nuclear reactor plants with this type of fuel assembly, since the positions of the control rod guide tubes remain unchanged. In this exemplary embodiment too, it is predominantly the inner rows or columns that are stabilized.

Moreover, a comparison of the buckling characteristics of the spacers shown in FIGS. 4 and 5 demonstrates that the configuration illustrated in FIG. 4 has an advantage over the spacer illustrated in FIG. 5 if the transverse force is greater than the buckling limit and buckling or kinking of the spacer occurs. In this case, the configuration of the control rod guide tubes illustrated in FIG. 4 forms a substructure of inherently stable structure which is offset in its entirety in the event of kinking without significant changes in the relative positions of the control rod guide tubes with respect to one another. In such a situation, it is still possible to introduce the control rods even in the event of kinking, since the uniform offset, the order of magnitude of which amounts to only a few millimeters, in mechanical terms corresponds to a uniformly bent fuel assembly. In other words, configurations in which the set of support tubes are distributed in such a manner in the spacer that there are no rows or columns without any support tubes located between rows or columns which include a support tube are particularly advantageous. In such a situation, the structure defined by the support tubes behaves as a stable sub-grid.

Figure 6:
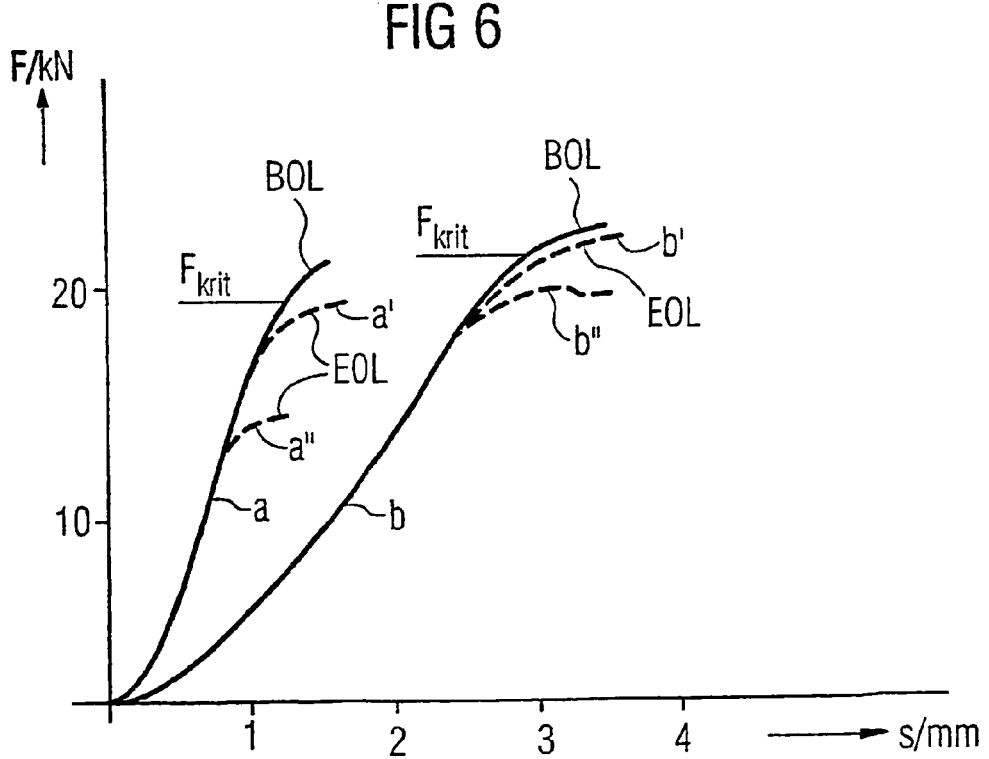
FIG. 6 is a diagram in which the deformation displacement of a spacer is plotted against the transverse force.
Figure 7:
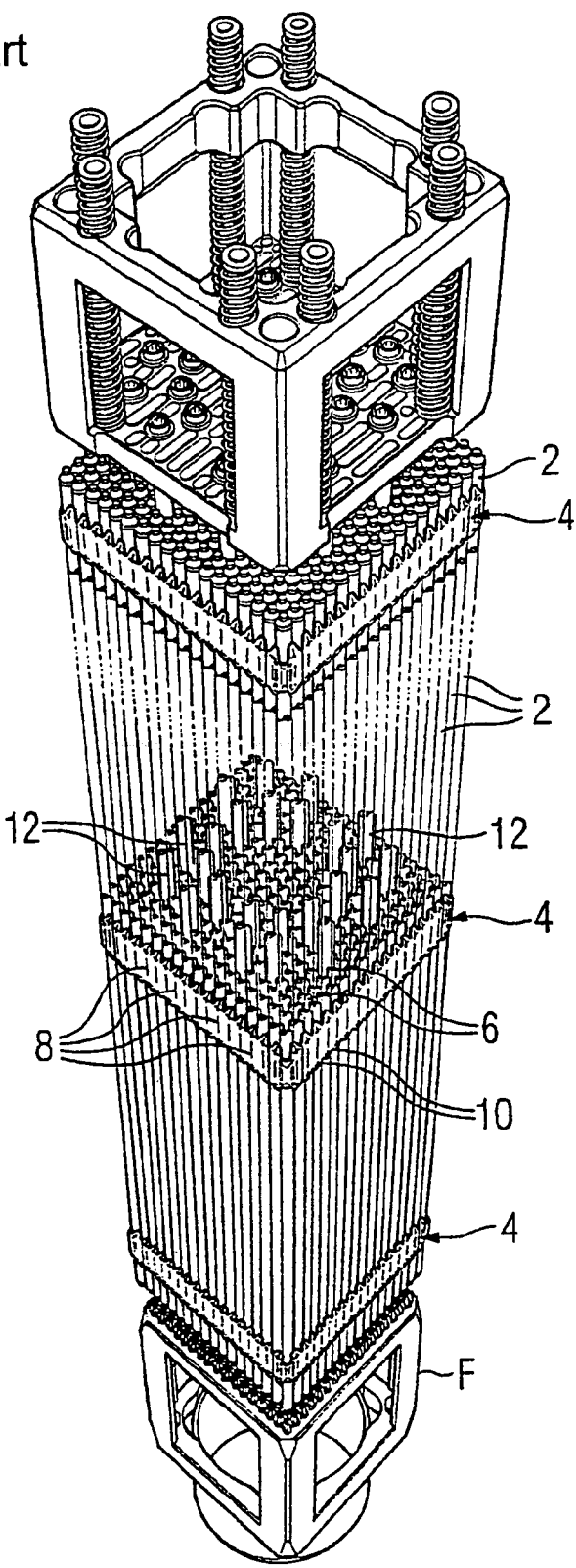
FIG. 7 is a top perspective view of a fuel assembly for a pressurized-water nuclear reactor according to the prior art.
Figure 8:
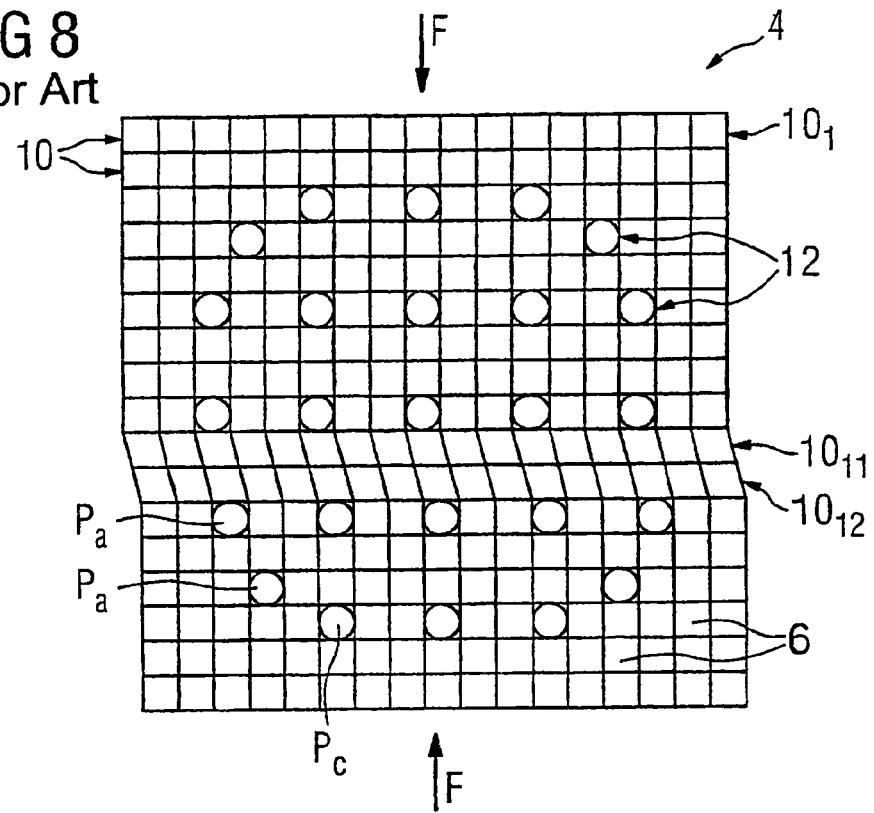
FIGS. 8 and 9 are diagrammatic plan views each showing a prior art spacer after a deformation test has been carried out.
Figure 9:
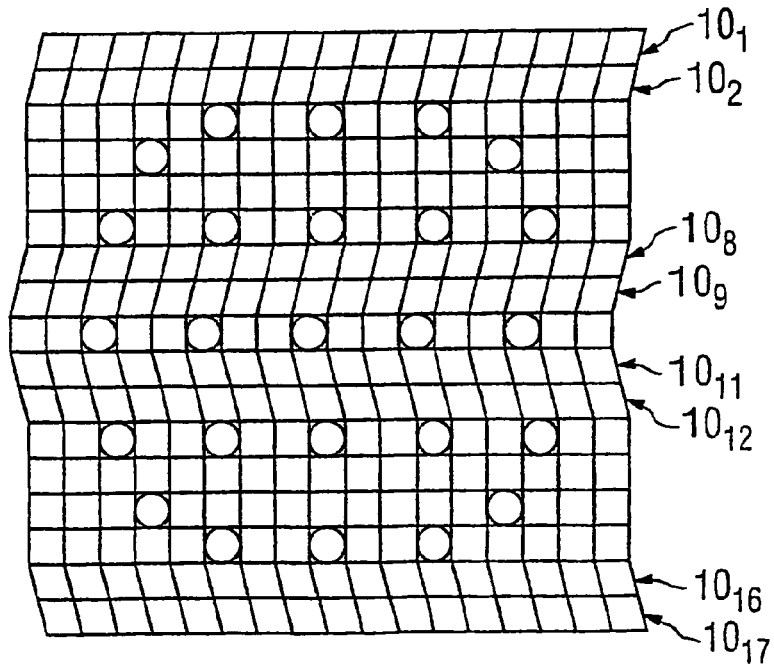

The diagram presented in FIG. 6 illustrates the buckling behavior of two spacers that have a different rigidity for the same distribution of the support tubes. This different rigidity results, in both material and design terms, from the configuration of the meshes (wall thickness, single or double web) and of the spring elements mounted or integrated therein, as well as the thickness and shape (linear weld, spot weld) of the weld seam at the crossing points of the meshes. Curves a and b show the deformation displacement S as a function of the transverse force F for a rigid and "soft" spacer, respectively. The curve that results with a new spacer (BOL spacer) is in each case represented by a solid line. Dashed lines indicate curves that result for a spacer of the same design at the end of its service life (EOL).

The dashed lines a' and b' denote curves of a spacer which has been optimized in accordance with the invention. Curves a", b" result with a spacer which has not been optimized in terms of the support tube arrangement. It is clearly apparent that the EOL buckling limit of the "soft" spacer does not deteriorate to such a pronounced extent, even without an optimized support tube configuration, as in the case of a "rigid" spacer. It can also be seen from the figure that the buckling limit $F_{crit}$ is reached at a lower deformation displacement in the case of the spacer having the greater rigidity (curve a) than in the case of the spacer with the lower rigidity (curve b). The reason for this is the stabilizing action of the fuel rods, which comes into force again in the event of a greater deformation displacement. This is ensured if the deformation displacement S before the buckling limit, which for BOL spacers is set at approximately 20 kN, is reached, amounts to at least 2 mm, preferably between 3 and 4 mm. This corresponds to a rigidity of the spacer of 10 kN/mm or between 7 and 5 kN/mm, respectively.

We claim:

1. A fuel assembly for a pressurized-water nuclear reactor, comprising:
    a multiplicity of fuel rods;
    a plurality of spacers mutually spaced-apart axially along said fuel rods, each of said spacers substantially defining a grid plane and forming a square grid with a multiplicity of meshes arranged in rows and columns, said rows including inner rows and said columns including inner columns;
    a plurality of support tubes respectively guided through said meshes and cohesively joined to said spacers at said meshes, said support tubes not containing fuel;
    said support tubes being distributed to positions in said grid such that, with a given number of support tubes in said grid, a distribution of said support tubes in said grid does not vary upon a rotation of said grid through 90° about a center axis extending perpendicular to said grid plane of said spacer; and
    wherein no inner rows and inner columns without said support tubes adjoin one another;
    the number of rows having no said support tubes being minimal and the number of columns having no said support tubes being minimal.

2. The fuel assembly according to claim 1, wherein, with a predetermined number of support tubes and meshes, said support tubes are distributed in said grid to form rows and columns without said support tubes exclusively at a margin of said spacer.

3. The fuel assembly according to claim 1, wherein at least one of said rows and said columns without a control rod guide tube is provided with at least one structure tube.

4. The fuel assembly according to claim 1, wherein at least one of said spacers has a stiffness of less than 10 kN/mm.

5. The fuel element according to claim 4, wherein said at least one spacer has a stiffness of between 5 and 7 kN/mm.

* * * * *